(No Model.)
H. D. PURSELL.
Ash-Pan Lifter.
No. 227,921.  Patented May 25, 1880.
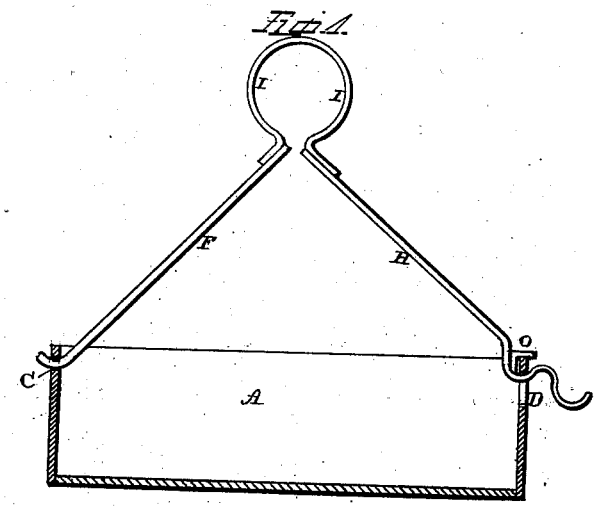
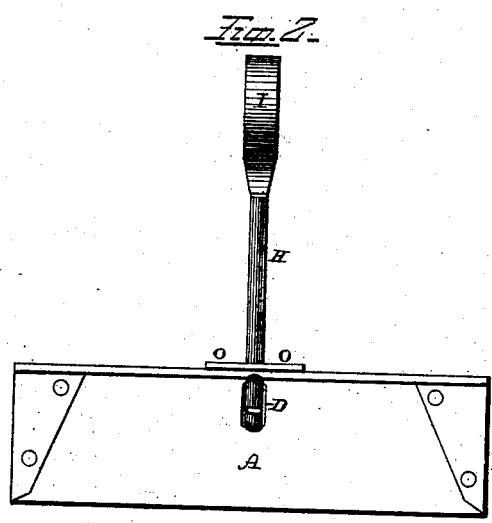
Witnesses=
W. W. Mortimer.
Will H. Kern.
Inventor=
H. D. Pursell,
per
F. A. Lehmann,
atty.
N. PETERS, PHOTO-LITHOGRAPHER, WASHINGTON, D. C.

United States Patent Office.

HARRY D. PURSELL, OF WASHINGTON COURT-HOUSE, OHIO.

ASH-PAN LIFTER.

SPECIFICATION forming part of Letters Patent No. 227,921, dated May 25, 1880.

Application filed March 25, 1880. (No model.)

*To all whom it may concern:*

Be it known that I, HARRY D. PURSELL, of Washington Court-House, in the county of Fayette and State of Ohio, have invented certain new and useful Improvements in Ash-Pan Tongs or Lifters; and I do hereby declare the following to be a full, clear, and exact description of the invention, such as will enable others skilled in the art to which it pertains to make and use it, reference being had to the accompanying drawings, which form part of this specification.

My invention relates to an improved tongs or lifter for ash-pans; and it consists in a lifter having two prongs, one of which has a double bend or curve formed on its lower end and a catch secured to the upper bend to prevent the pan from tipping over while being carried.

It further consists in the peculiar combination and arrangement of parts that will be more fully described hereinafter, whereby pans filled with ashes and other such material can be readily lifted and carried about.

The object of my invention is to provide a lifter or tongs which can be readily inserted into ash-pans which have no handles and which have been filled with hot ashes, or where it is desired to prevent the hands from being soiled in moving the pan about.

Figure 1 is a side elevation of my invention, showing the pan in section. Fig. 2 is an edge view of the same.

A represents a common rectangular ash-pan without handles, and which has a hole, C, made through one side and a slot, D, through the other.

The two prongs F H of the lifter are secured together at their upper ends by means of the spring I, which spring holds the lower ends of the tongs pressed outward with sufficient tension to hold them secure in the pan after they have been once applied to it.

The prong F consists of a straight rod, which has its lower end simply bent outward, so as to pass through the hole C; but the prong H has its outer end provided with a double bend or curve, as shown. Secured rigidly in the upper one of these two bends or curves is a V-shaped piece of metal, O, which catches over the top edge of the pan after this double-curved end has been passed through the slot D, and thus prevents the pan from turning or tilting while being carried. Were it not for this V-shaped piece, which catches both against the inside of the pan and over its top edge, the pan would be constantly liable to turn upon the two ends of the lifter in case the ashes were not equally distributed over the bottom of the pan, or in case the pan should accidentally strike against anything while being carried about.

By having two bends or curves in the prong H either one can be made to catch in the slot. When the upper one is made to catch in the slot the V-shaped piece O holds the lifter in an upright position and prevents the pan from tilting, as above described; but when it is desired to dump the ashes the two prongs are compressed together sufficiently to disengage the upper bend or curve from the slot in the pan, and the lower bend is then made to catch in it. As the pan is thus held the two ends of the lifter form pivots upon which the pan will readily turn for the purpose of emptying out its contents without having to touch the pan with the hand.

By means of this lifter pans filled with hot ashes or garbage of any kind can be readily carried about with perfect safety.

Having thus described my invention, what I claim, and desire to secure by Letters Patent, is—

1. In an ash-pan lifter, the prong H, provided with two hooks or bends on its lower end, the lower one of which hooks or bends serves as a pivot upon which the pan tilts, substantially as shown.

2. A lifter for pans, composed of the two prongs F H and a spring for uniting them together, the prong H being provided with two bends or curves on its lower end and a device, O, for catching over the edge of the pan, the parts being arranged and combined to operate substantially as set forth.

In testimony that I claim the foregoing I have hereunto set my hand this 15th day of March, 1880.

HARRY D. PURSELL.

Witnesses:
Z. W. HEAGLER,
C. J. BELL.